Patented Dec. 11, 1945

2,390,836

UNITED STATES PATENT OFFICE 2,390,836

METHOD OF ALKYLATING AROMATIC COMPOUNDS

George Felix Hennion, South Bend, Ind., and Norbert Francis Toussaint, Louisville, Ky., assignors to E. I. du Pont de Nemours & Company, Wilmington, Del., a corporation of Delaware No Drawing. Original application April 30, 1940, Serial No. 332,476. Divided and this application May 19, 1943, Serial No. 487,658

6 Claims. (Cl. 260—671)

This invention relates to a new method of alkylating aromatic compounds and more particularly to a new method for condensing an aromatic compound with an aliphatic alcohol containing 3 or more carbon atoms.

It is an object of this invention to develop a new method of alkylation which gives satisfactory yields of alkylated products. A further object is to provide a novel method of alkylation which makes it unnecessary to use pressure equipment or excessive amounts of condensing agent. A still further object is to develop a superior process for condensing an aliphatic alcohol with an aromatic compound. Other objects will appear hereinafter.

These objects are accomplished by the following invention according to which an organic compound containing an aromatic nucleus is alkylated by reacting said organic compound with an aliphatic alcohol containing at least 3 carbon atoms in the presence of boron trifluoride and an assistant acidic condensing agent selected from the group consisting of sulfuric acid and benzenesulfonic acid. The alkylation products thus obtained can be separated into their constituents by simple fractionation.

The following examples illustrate but do not limit the invention. All parts are given by weight except where it may be otherwise noted.

Example I.—Amyl benzene 25 parts of 94% sulfuric acid was added to a solution of 44 parts (0.5 mol) of n-amyl alcohol in 312 parts (4 mols) of benzene previously saturated with 34 parts (0.5 mol) of boron fluoride. After heating for 5½ hours the upper layer was separated, washed and fractionated. Distillation gave 59.2 parts (80%) of sec-amyl-benzene.

Example II.—Dodecyl benzene 0.5 mol of n-dodecyl alcohol was heated for 10 hours with 2 mols of benzene in the presence of 1 mol of 94% sulphuric acid and 0.5 mol of boron trifluoride. A 46.4% yield of monododecyl benzene was thus obtained.

Example III.—Butyl benzene

A 63% yield of mon-butyl-benzene was obtained when 0.5 mol of n-butyl alcohol was heated for 4 hours with 2 mols of benzene in the presence of 0.5 mol of boron trifluoride and 0.5 mol of benzene sulphonic acid.

Example IV.—Dodecyl benzene 0.5 mol of n-dodecyl alcohol was heated for 10 hours with 2 mols of benzene in the presence of 0.5 mol of boron trifluoride and 0.5 mol of benzene sulphonic acid. A 44.6% yield of mono-dodecyl benzene was thus obtained.

The benzene sulphonic acid used in the two preceding examples may be generated in situ by passing boron trifluoride into a solution of 1 mol of benzene and 1 mol of 94% sulphuric acid. This gives complete sulphonation, and the product may be used without further purification as a catalyst in this alkylation reaction.

In accordance with the procedure which is exemplified by the preceding examples many alkyl substituted aromatic compounds can be made by alkylating an organic compound containing an aromatic nucleus with an aliphatic alcohol containing at least three carbon atoms in the presence of boron trifluoride and an assistant acidic condensing agent selected from the group consisting of sulfuric acid and benzenesulfonic acid. Mixtures of monoisopropyl benzene and di-isopropyl benzene can be obtained by thus alkylating benzene with either normal propyl alcohol or isopropyl alcohol. Secondary-butyl benzene and para-di-secondary-butyl benzene may be prepared by butylating benzene with normal butyl alcohol. Alkylation of benzene with either iso-butyl alcohol or tertiary butyl alcohol yields mono-tertiary-butyl benzene and di-tertiary-butyl benzene. Reaction of benzene with normal amyl alcohol in accordance with this invention yields secondary-amyl benzene and di-amyl benzene. Benzene may be alkylated with a mixture of aliphatic alcohols containing 6 and 7 carbon atoms obtainable in the methyl alcohol synthesis to yield mono-, di-, and tetra-alkylated benzenes. Mono-octyl benzene, di-octyl benzene, and tri-octyl benzene may be prepared in accordance with the present invention by alkylating benzene with normal octyl alcohol. Alkylation of naphthalene with octyl alcohol yields a mixture of mono-octyl naphthalene and di-octyl naphthalene. A mixture of mono-octyl beta-methyl naphthalene and di-octyl beta-methyl naphthalene can be prepared by alkylating beta-methyl naphthalene with normal octyl alcohol. The reaction of 2-ethyl-hexanol with benzene yields a mixture of mono-2-ethyl-hexyl benzene and di-2-ethyl-hexyl benzene. When decyl alcohol is used to alkylate benzene, a mixture of monodecyl benzene and didecyl benzene is obtained. Similarly, when normal decyl alcohol is used to alkylate meta-xylene, a mixture of the decyl and didecyl xylenes is obtained. Decyl tetrahydronaphthalene may be made by the reaction of decyl alcohol with tetrahydronaphthalene. When benzene is alkylated with normal dodecyl alcohol, mono-dodecyl benzene is obtained along with some di-dodecyl benzene. Reaction of normal dodecyl alcohol with naphthalene yields mono-dodecyl naphthalene and di-dodecyl naphthalene. Reaction of normal dodecyl alcohol with diphenyl oxide yields mono-dodecyl diphenyl oxide.

In place of the alcohols which are mentioned above we may use hexyl alcohol, cyclohexanol, methyl cyclohexanol, nonyl alcohol, etc.

It is apparent that a wide variety of aromatic compounds can be alkylated by the methods disclosed above. In accordance with this invention it is possible to alkylate still other aromatic compounds such as cymene, anthracene, phenanthrene, fluorene, methyl benzoate, dimethyl aniline, acetophenone, carbazole, thianthrene, phenol, cresol, naphthol, anisole, phenetole, brombenzene, etc.

This application is a division of our copending application, Serial No. 332,476, filed April 30, 1940.

Resort may be had to such modifications and equivalents as fall within the spirit and scope of the appended claims.

We claim:

1. A process for alkylating an organic compound containing an aromatic nucleus which comprises reacting said compound with an aliphatic alcohol containing at least 3 carbon atoms in the presence of boron trifluoride and an assistant acidic condensing agent selected from the group consisting of sulfuric acid and benzenesulfonic acid.

2. A process for alkylating an organic compound containing an aromatic nucleus which comprises reacting said compound with an aliphatic alcohol containing at least 3 carbon atoms in the presence of boron trifluoride and sulfuric acid.

3. A process for alkylating an aromatic hydrocarbon of the benzene and naphthalene series which comprises reacting said hydrocarbon with an aliphatic alcohol containing at least 3 carbon atoms in the presence of boron trifluoride and an assistant acidic condensing agent selected from the group consisting of sulfuric acid and benzenesulfonic acid.

4. A process for alkylating an aromatic hydrocarbon of the benzene and naphthalene series which comprises reacting said hydrocarbon with an aliphatic alcohol containing at least 3 carbon atoms in the presence of boron trifluoride and sulfuric acid.

5. A process for alkylating benzene which comprises reacting benzene with an aliphatic alcohol containing at least 3 carbon atoms in the presence of boron trifluoride and an assistant acidic condensing agent selected from the group consisting of sulfuric acid and benzenesulfonic acid.

6. A process for alkylating benzene which comprises reacting benzene with an aliphatic alcohol containing at least 3 carbon atoms in the presence of boron trifluoride and sulfuric acid.

GEORGE FELIX HENNION.
NORBERT FRANCIS TOUSSAINT.